Figure 1:
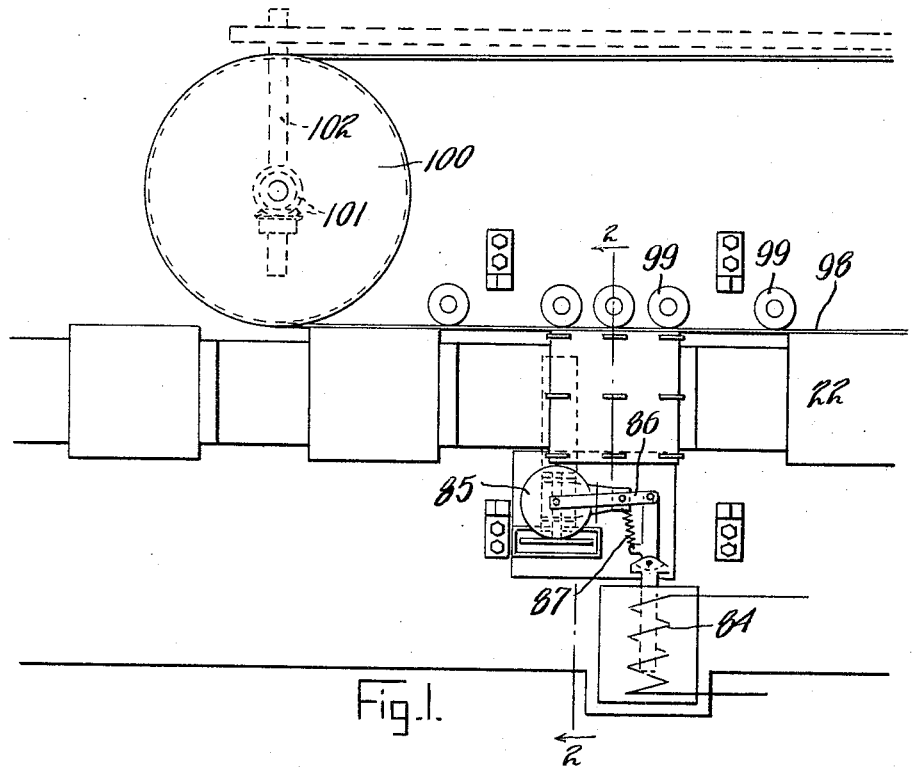

May 23, 1933. J. A. BOWER 1,910,461
MEANS FOR DETECTING AND MARKING WARPED TILE
Filed June 1, 1931 4 Sheets-Sheet 1

Inventor
James A. Bower

Attorney

May 23, 1933.   J. A. BOWER   1,910,461
MEANS FOR DETECTING AND MARKING WARPED TILE
Filed June 1, 1931   4 Sheets-Sheet 2
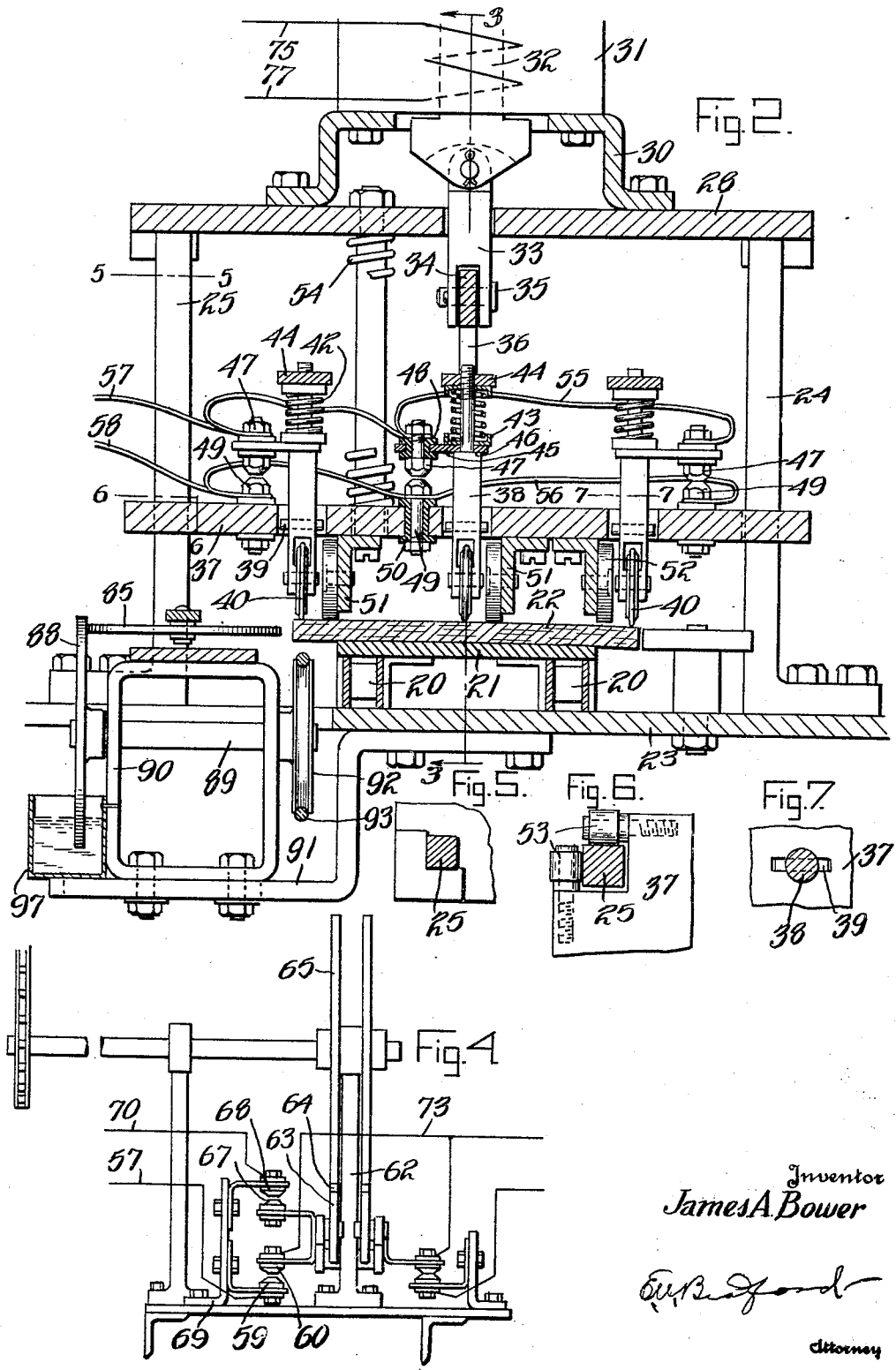
Inventor
James A. Bower

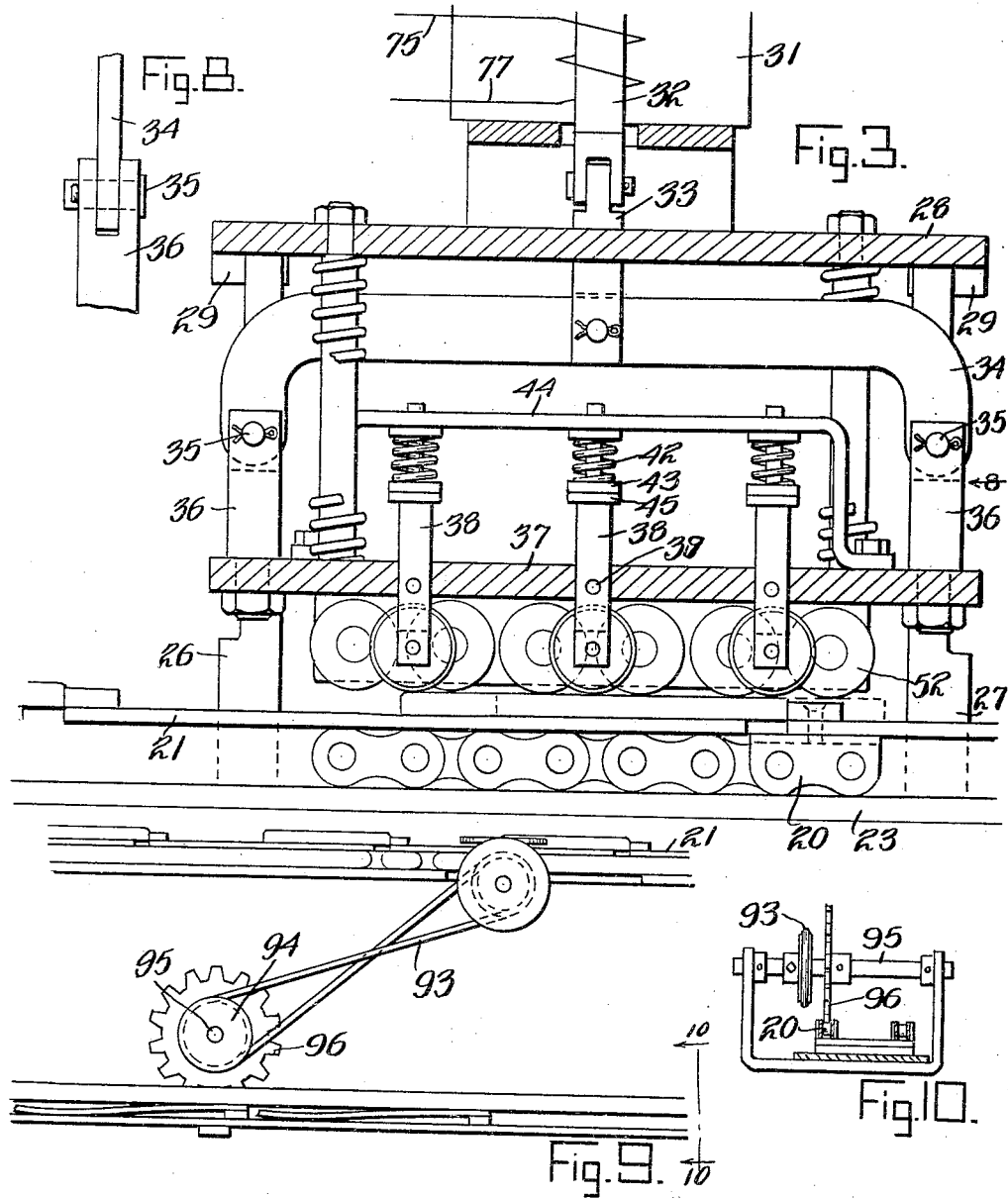

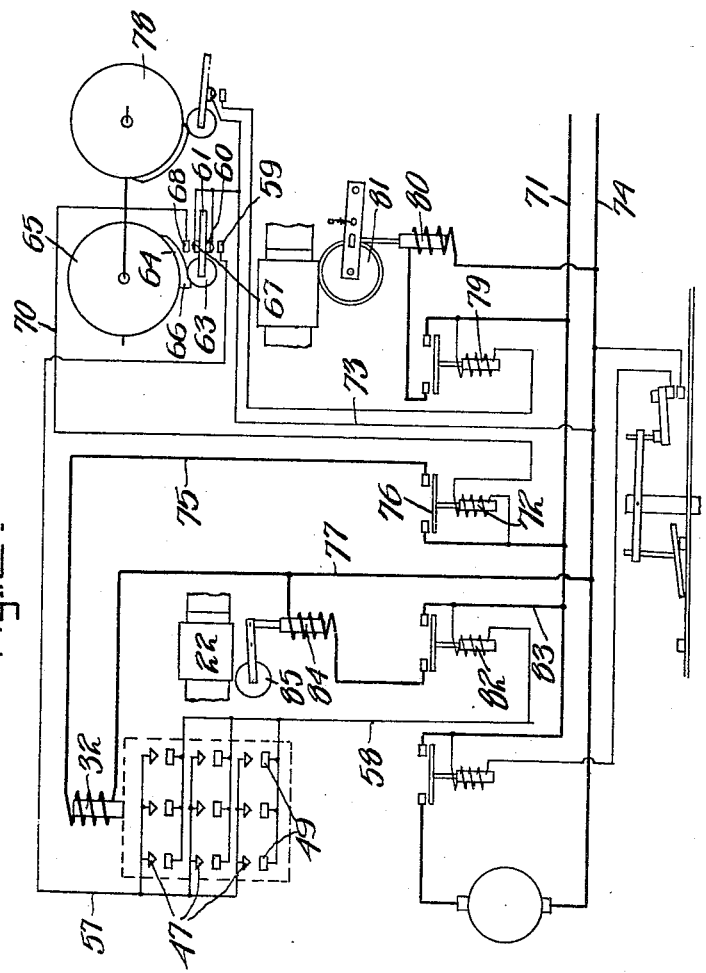

Patented May 23, 1933

1,910,461

UNITED STATES PATENT OFFICE

JAMES ARTHUR BOWER, OF ANDERSON, INDIANA, ASSIGNOR TO THE NATIONAL TILE COMPANY, OF ANDERSON, INDIANA, A CORPORATION OF OHIO

MEANS FOR DETECTING AND MARKING WARPED TILE

Application filed June 1, 1931. Serial No. 541,497.

This invention relates to means for detecting warped tile as they pass through a suitable conveyor and for marking the tile to indicate the defective ones so that they may be separated from the good tile at the end of the conveyor.

An object of the invention is to provide a machine for marking tile in which warpage is detected and marked while the tile is in continuous motion through the machine.

A further general object is to provide a machine in which warped tile may be detected and marked at high speed operation of the machine without injury to the machine or the tile.

Referring to the accompanying drawings, which are made a part hereof and on which similar reference characters indicate similar parts, Figure 1 is a plan view of part of the conveyor, Figure 2, a transverse section on line 2—2 of Fig. 1, Figure 3, a section on line 3—3 of Figure 2, Figure 4, a detail of a portion of a control member, Figures 5, 6 and 7 sections as indicated in Fig. 2, Fig. 8, a detail view indicated by the arrow in Fig. 3, Figure 9, a side elevation of a drive for the inking disk for marking the tile, Figure 10, a section on line 10—10 of Figure 9, Figure 11 indicates a tile marked for being warped, and Figure 12, a diagrammatic view of the control circuits.

Referring to the drawings numeral 20 indicates the tile conveyor chain having flexible pads 21 upon which the tile 22 rests. Conveyor chain travels over a plate 23. Attached upon the plate 23 are posts 24, 25, 26 and 27. These posts carry on their upper ends a plate 28, the plate being supported across the conveyor. Blocks 29 are attached to the underside of the plate 28. The blocks serve for positioning the plate 28 upon the ends of the posts 24, 25, 26, 27, so that the plate 28 will be properly located above the tile conveyor. A support 30 is mounted on the top of the plate 28 and on this support is mounted a solenoid 31. The solenoid carries a core 32 to the lower end of which is attached a link 33 which supports a yoke 34. Studs 36 are attached to the ends of the yoke by pins 35. The studs are secured at their lower ends in a detector plate 37. The detector plate 37 has a number of holes through it through which project sliding rods 38. The sliding rods have cross pins 39 which register with slots in the detector plate 37 to prevent the rods from turning, see Figure 7. The lower ends of the rods 38 carry contact rollers 40 and are slotted to straddle these rollers. The rollers rest upon the face of the tile 22. The rollers have a thin contact rim 41 so as to provide a narrow edge in engagement with the tile. The rods 38 have small upper ends around which are positioned compression springs 42. The springs rest against washers 43 on the pins at their lower end and against brackets 44 at their upper ends. The springs 42 therefore tend to push down on the rods 38. The rods also carry plates 45 which are held between the washers 43 and the shoulders 46 on the rods. The plates 45 carry contact members 47 which are insulated by means of bushings 48 from the plates 45. Contact members 49 are carried by the detector plate 37. These contact members also are insulated from the plates 37 by means of bushings 50.

Brackets 51 are fastened to the bottom of detector plate 37. These brackets carrying leveling rollers 52 which form three banks of leveling ways. These leveling rollers moreover are located adjacent each longitudinal set of contact rollers 40. The leveling rollers also make a bearing upon the tile for the detector plate 37 as it is let down by the solenoid 31. All of the roller axes are transverse to the conveyor 20. The detector plate 37 has its corners cut out as shown in Figure 6 and rollers 53 are set in to bear against the posts 24, 25, 26 and 27 to reduce friction as the detector plate is moved up and down. The detector plate 37 is urged downwardly by springs 54 which engage the underside of the plate 28 and the top of the detector plate 37.

All of contact members 47 are electrically connected by a wire 55 and all of contacts 49 are connected together by a wire 56. Wires 57 and 58 connect to the contacts 47 and 49 respectively. The contacts 47 are connected through the wire 57 with one member 59 of a timing switch shown in Figure 4, the other member 60 of the timing switch is attached to an arm 61 pivoted to a bracket 62. The arm 61 carries a roller 63 at its outer end which engages a cam 64 on a cam wheel 65. The raised portion 66 located at the trailing end of the cam serves to close contacts 59 and 60 after the detector plate 37 has been lowered so that leveling rollers 52 rest on the tile and at a time when the tile is in position when all nine of the detector rollers 40 are within the bounds of the tile, as shown in full lines in Figure 2.

The cam 64 also controls a contact member 67 attached to the arm 61 and when the cam 64 is out of range of the roller 63 the contact 67 is in engagement with another contact 68 which is mounted on a bracket 69 mounted on the frame of the machine. A wire 70 connects power line 71 through a relay solenoid 72. A wire 73 connects contacts 60 and 67 with power line 74. When contacts 67 and 68 are closed the solenoid 72 is energized to close switch 76 and energize solenoid 32 through lines 75 and 77, to raise detector plate 37 up so that all rollers 40 and 52 are out of contact with the tile. Cam 78 controls a circuit through relay solenoid 79 to energize solenoid 80 to operate roller 81. This feature forms no part of the present invention but is shown for the purpose of illustrating the complete machine. The same being more fully described in my co-pending application Serial No. 541,495 filed June 1, 1931 for tile width and length measuring and marking machines.

When any of contacts 47 and 49 are closed a circuit is formed through lines 58 and through solenoid 82 to energize this solenoid to colse relay switch 82 to close circuit from power lines 71 and 74 through line 83 and 77. This energizes a solenoid 84 to operate a marking roller 85. The roller 85 is carried on an arm 86 pivoted to the frame of the machine. The roller 85 is normally held out of contact with the tile by a spring 87. When the roller 80 is in the position shown in Figure 2 its periphery is in engagement with an inking disk 88. The disk is mounted on a shaft 89 which is journaled in a frame 90 which is supported on a bracket 91. The shaft 89 is driven by a grooved pulley 92 and a belt 93. The belt 93 is driven by a pulley 94 on a shaft 95. The shaft 95 carries a sprocket 96 which engages with and is driven by the conveyor 20. The bracket 91 is slotted to permit proper adjustment of the frame 90 to position the roller 85 in proper relation to the edge of the tile. A pan 97 is attached to the bracket 91. This pan is filled with ink into which the periphery of the inking disk 88 dips. The inking disk extends up through a slot in the plate 23. The edges of the tile opposite the inking disk are engaged by a steel belt 98 which belt is held in engagement with the edges of the tile by means of rollers 99 which are fixed to the frame of the machine. The steel belt is driven by means of a roller 100, the roller being driven in any suitable way as by means of intermeshing beveled gears 101 and a shaft 102.

When the leveling rollers 52 and the detector rollers 40 make contact with a true plane surface the rollers 40 and the rods 38 move up so that contacts 47 and 49 are separated a uniform predetermined distance. This distance may be in the neighborhood of twenty thousandths (0.020) of an inch as in this case.

When any surface having a depression or a warped portion comes under the rollers and such surface is greater than the predetermined tolerance one or more of the contacts are left closed.

The operation of the machine is as follows: As the tile operates within range of 3 or 4 successive rollers 52 of the leveling group, the timing roller 63 having been out of range of the cam 64 and thereby permitting circuits 67 and 68 to be closed to hold detector plate 37 up, now breaks contact between switch members 67 and 68 to deenergize the solenoid 72 and let detector plate 37 drop to bring the rollers 52 against the top face of the tile. As the tile moves on so that all detector rollers 40 come within the boundary of the tile as shown in full lines in Figure 2, the timing roller 63 mounts the raised portion of the cam 64 and closes momentarily the contacts 59 and 60 and opens circuit through 72 and deenergizes the solenoid 32. Should a tile be within the tolerance permitted the contacts 47 and 49 will remain open and no mark will be made on the edge of the tile by the marking roller 85, but if one or more of the detector rollers 40 drops into a depression or a high point supports leveling rollers 52 beyond the established tolerance then the circuit through solenoid 82 is closed so that the roller 85 is caused to come against the edge of the tile to mark the same. As the timing roller 63 returns to its original position the circuits through the solenoid 82 are open and circuits through solenoids 72 and 32 are closed so as to withdraw the roller 85 from the tile and lift the plate 37. As the plate 37 is lifted the rollers 40 and 52 are lifted clear of the tile. The tile conveyor therefore continues with marked tile a sufficient distance for the operators to remove them and stack them in accordance with the marks on their edges.

From the foregoing it will be seen that the tile are gauged and warped tile marked while they are moving at full speed through the machine. The warped tile are in no way injured by the machine.

While the machine is particularly adapted for marking warped tile it may find usefulness in marking other articles some of which may have faces which are not perfect planes. The word tile therefore is meant to be general in scope and to cover all articles of similar shape.

It will be obvious to those skilled in the art that various changes may be made in my device without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. Means for detecting and marking warped tiles comprising a plurality of rollers adapted to rest upon the face of the tile, a plurality of detector rollers positioned adjacent said first named rollers, and movable relative to the first named rollers to follow variations in the surface of the tile, contacts operated by said rollers, said contacts being in control of marking means for marking tile in accordance with differences due to a warped condition of the tile, substantially as set forth.

2. A warp detector and marking machine for tile, comprising a detector plate, means for moving the said detector plate toward and from the face of a tile, a plurality of rollers engageable with a face of the tile, a plurality of detecting rollers carried by the said detector plate to be moved vertically in response to variations in the surface of a tile, tile marking means, and electrical means for operating said marking means in accordance with the variations in the surface of the tile, substantially as set forth.

3. A tile grading device comprising means operable by variations in the face of the tile for marking the edge of tile warped beyond a predetermined tolerance, substantially as set forth.

4. A tile grading device comprising means operable upon variations in the face of the tile for marking the edge of tile warped beyond a predetermined tolerance, and means for continuously moving the tile, the said marking means operating during the movement of the tile, substantially as set forth.

5. A machine for detecting and marking warped tile comprising means engageable with the face of the tile, other means positioned adjacent the first named means, means operable upon relative movement of the two said means for closing electric circuits, and a marker positioned adjacent the edge of a tile, said marker being operable upon closing of the said circuits to mark the edge of the tile to indicate it as defective as regards a standard of tile perfection, substantially as set forth.

6. A machine for detecting and marking warped tile comprising a continuously moving conveyor belt having tile positioned thereon, a plurality of detector elements, an electric circuit, contact points carried by said elements, movement of such elements beyond a predetermined amount due to a warped tile operating to close the said circuits, and tile marking means operated by the said circuit, substantially as set forth.

7. Means for detecting and marking warped tile comprising a continuously moving conveyor belt having tile positioned thereon, a marking roller positioned adjacent one edge of the tile, backing up rollers positioned opposite the marking roller to hold the tile in position when engaged by the marking roller, and a plurality of contact fingers in engagement with the surface of the tile, an electric circuit in control of means for moving the marking roller, said contact fingers operating to close said circuit when said contact fingers engage a tile which is warped beyond a predetermined amount, substantially as set forth.

8. In a tile conveying machine having a continuously moving conveyor, means for detecting and marking warped tile on the conveyor comprising a frame having rollers thereon in contact with the surface of the tile as the tile pass a given point, a second frame having a plurality of brackets carrying rollers in contact with the surface of the tile, said last-named rollers being movable independently of each other and independently of the first named rollers, a marking roller, electrical means for operating said roller, an electric circuit, a switch in said circuit, said switch being closed when the last named rollers ride over a portion of the tile which is warped beyond a predetermined amount, substantially as set forth.

9. A machine for gaging and marking warped tile comprising a conveyor having tile positioned thereon, means for holding the tile in alinement on the conveyor, a marker adapted to engage the edge of the tile to indicate a defective tile, an electric circuit for controlling said marking roller, and means in contact with the surface of the tile and operable when engaging a warped portion of the tile for closing the said circuit to operate the marking roller, the detecting and marking taking place during continuous movement of the tile by the conveyor belt, substantially as set forth.

10. A machine for detecting and marking warped tile comprising a continuously moving conveyor belt having tile positioned thereon, a marking roller positioned adjacent one edge of the tile, backing up rollers positioned opposite the marking roller to hold the tile in position when engaged by the marking roller, a vertically movable electrically operated carriage positioned over the tiles adjacent the marking roller, movable detector elements carried by said carriage, contact points carried by said elements, a circuit to said contact points, and a second cam-operated switch controlling said circuit and adapted to operate said marking roller, substantially as set forth.

In witness whereof, I have hereunto set my hand at Anderson, Indiana this twenty-fifth day of May, A. D. nineteen hundred and thirty-one.

JAMES ARTHUR BOWER.